US008646013B2

(12) United States Patent
Curtis et al.

(10) Patent No.: US 8,646,013 B2
(45) Date of Patent: Feb. 4, 2014

(54) IDENTIFYING INSTANCES OF MEDIA PROGRAMMING AVAILABLE FROM DIFFERENT CONTENT SOURCES

(75) Inventors: Sean Curtis, Rockville Center, NY (US); Frank Conway, Hoboken, NJ (US); David Charles Lankford, New York, NY (US); Deepak Jhalani, Jersey City, NJ (US); Ryan Case, Brooklyn, NY (US)

(73) Assignee: Sling Media, Inc., Foster City, CA (US)

( * ) Notice: Subject to any disclaimer, the term of this patent is extended or adjusted under 35 U.S.C. 154(b) by 95 days.

(21) Appl. No.: 13/098,192

(22) Filed: Apr. 29, 2011
(Under 37 CFR 1.47)

(65) Prior Publication Data

US 2012/0278844 A1    Nov. 1, 2012

(51) Int. Cl.
*H04N 7/173* (2011.01)
(52) U.S. Cl.
USPC ............ 725/93; 725/39; 725/46; 725/48; 709/203; 709/204; 715/748
(58) Field of Classification Search
USPC ............ 725/91, 93, 39, 46, 48; 709/203, 204, 709/246; 715/748
See application file for complete search history.

(56) References Cited

U.S. PATENT DOCUMENTS

| 5,434,678 | A | 7/1995 | Abecassis |
|---|---|---|---|
| 5,438,423 | A | 8/1995 | Lynch et al. |
| 5,610,653 | A | 3/1997 | Abecassis |
| 5,684,918 | A | 11/1997 | Abecassis |
| 5,696,869 | A | 12/1997 | Abecassis |
| 5,892,536 | A | 4/1999 | Logan et al. |
| 5,953,485 | A | 9/1999 | Abecassis |
| 6,088,455 | A | 7/2000 | Logan et al. |
| 6,091,886 | A | 7/2000 | Abecassis |
| 6,151,444 | A | 11/2000 | Abecassis |
| 6,208,805 | B1 | 3/2001 | Abecassis |
| 6,408,128 | B1 | 6/2002 | Abecassis |
| 6,421,429 | B1 | 7/2002 | Merritt et al. |
| 6,553,178 | B2 | 4/2003 | Abecassis |
| 6,931,451 | B1 | 8/2005 | Logan et al. |
| 7,055,166 | B1 | 5/2006 | Logan et al. |
| 7,058,376 | B2 | 6/2006 | Logan et al. |
| 7,127,507 | B1 | 10/2006 | Clark et al. |
| 7,370,343 | B1 | 5/2008 | Ellis |

(Continued)

OTHER PUBLICATIONS

Carlson, T. "Mule 2.x Getting Started Guide," Apr. 15, 2008, 134 pages.

(Continued)

*Primary Examiner* — Brian Pendleton
*Assistant Examiner* — Alan Luong
(74) *Attorney, Agent, or Firm* — Ingrassia Fisher & Lorenz, P.C.

(57) ABSTRACT

Systems and methods are provided for identifying instances of media programming available within a media distribution system. An exemplary method involves searching a listing of media programming available from a first content source using search criteria indicative of a desired media program to identify an instance of the desired media program available from the first content source, obtaining a target program identifier associated with the desired media program from that instance, identifying another instance of the desired media program in a second listing of media programming available from another content source using the target program identifier, and providing a combined search result that indicates availability of the desired media program from the content sources.

24 Claims, 5 Drawing Sheets

(56) References Cited

U.S. PATENT DOCUMENTS

| | | |
|---|---|---|
| 7,430,360 B2 | 9/2008 | Abecassis |
| 7,478,164 B1 | 1/2009 | Lango et al. |
| 7,478,166 B2 | 1/2009 | Agnoli et al. |
| 7,594,218 B1 | 9/2009 | Lozben |
| 7,676,590 B2 | 3/2010 | Silverman et al. |
| 7,721,300 B2 | 5/2010 | Tipton et al. |
| 7,895,275 B1 | 2/2011 | Evans et al. |
| 7,921,150 B1 | 4/2011 | Schwartz |
| 7,945,688 B1 | 5/2011 | Lango et al. |
| 8,181,206 B2 | 5/2012 | Hasek |
| 2002/0042921 A1 | 4/2002 | Ellis |
| 2002/0059621 A1 | 5/2002 | Thomas et al. |
| 2002/0120925 A1 | 8/2002 | Logan |
| 2002/0143972 A1 | 10/2002 | Christopoulos et al. |
| 2003/0093790 A1 | 5/2003 | Logan et al. |
| 2003/0149988 A1 | 8/2003 | Ellis et al. |
| 2003/0233656 A1 | 12/2003 | Sie et al. |
| 2004/0194141 A1 | 9/2004 | Sanders |
| 2004/0255330 A1 | 12/2004 | Logan |
| 2004/0255334 A1 | 12/2004 | Logan |
| 2004/0255336 A1 | 12/2004 | Logan et al. |
| 2005/0005308 A1 | 1/2005 | Logan et al. |
| 2005/0155077 A1 | 7/2005 | Lawrence et al. |
| 2006/0015925 A1 | 1/2006 | Logan |
| 2006/0095401 A1 | 5/2006 | Krikorian et al. |
| 2006/0171395 A1 | 8/2006 | Deshpande |
| 2006/0190616 A1 | 8/2006 | Mayerhofer et al. |
| 2006/0206526 A1 | 9/2006 | Sitomer |
| 2006/0230345 A1 | 10/2006 | Weng et al. |
| 2006/0265384 A1 | 11/2006 | Lee et al. |
| 2006/0280177 A1 | 12/2006 | Gupta et al. |
| 2006/0280437 A1 | 12/2006 | Logan et al. |
| 2006/0294183 A1 | 12/2006 | Agnoli et al. |
| 2007/0043792 A1 | 2/2007 | O'Brien |
| 2007/0061783 A1 | 3/2007 | Prakash |
| 2007/0067390 A1 | 3/2007 | Agnoli et al. |
| 2007/0073767 A1 | 3/2007 | Springer, Jr. et al. |
| 2007/0113250 A1 | 5/2007 | Logan et al. |
| 2007/0136778 A1 | 6/2007 | Birger et al. |
| 2007/0157237 A1* | 7/2007 | Cordray et al. ................. 725/42 |
| 2007/0274327 A1 | 11/2007 | Kaarela et al. |
| 2007/0283393 A1* | 12/2007 | Kikinis ........................... 725/53 |
| 2007/0300258 A1 | 12/2007 | O'Connor et al. |
| 2008/0007651 A1 | 1/2008 | Bennett |
| 2008/0036917 A1 | 2/2008 | Pascarella et al. |
| 2008/0155079 A1 | 6/2008 | Spiegelman |
| 2008/0195698 A1 | 8/2008 | Stefanovic et al. |
| 2008/0215392 A1 | 9/2008 | Rajan |
| 2009/0037954 A1* | 2/2009 | Nagano .......................... 725/39 |
| 2009/0103607 A1 | 4/2009 | Bajpai et al. |
| 2009/0157777 A1 | 6/2009 | Golwalkar et al. |
| 2009/0254672 A1 | 10/2009 | Zhang |
| 2009/0268740 A1 | 10/2009 | Sindhu et al. |
| 2010/0023642 A1 | 1/2010 | Ladd et al. |
| 2010/0169477 A1 | 7/2010 | Stienhans et al. |
| 2010/0175090 A1* | 7/2010 | Cordray .......................... 725/58 |
| 2010/0226444 A1 | 9/2010 | Thevathasan et al. |
| 2010/0269144 A1 | 10/2010 | Forsman et al. |
| 2010/0281042 A1 | 11/2010 | Windes et al. |
| 2010/0309916 A1 | 12/2010 | Oskouy et al. |
| 2010/0333162 A1 | 12/2010 | Lloyd et al. |
| 2011/0002381 A1 | 1/2011 | Yang et al. |
| 2011/0047079 A1 | 2/2011 | Du et al. |
| 2011/0050908 A1 | 3/2011 | Nam |
| 2011/0125861 A1 | 5/2011 | Evans et al. |
| 2011/0307608 A1 | 12/2011 | Chang et al. |
| 2012/0039580 A1* | 2/2012 | Sweatt et al. ................. 386/230 |
| 2012/0166669 A1 | 6/2012 | Price |
| 2012/0219001 A1 | 8/2012 | Sindhu et al. |

OTHER PUBLICATIONS

Paul, John et al "Systems and Methods for Remotely Controlling a Media Server Via a Network," U.S. Appl. No. 12/645,870, filed Dec. 23, 2009; uploaded as Part 1 and Part 2.

Paul, John et al. "Systems and Methods for Searching Media Content," U.S. Appl. No. 12/648,024, filed Dec. 28, 2009; uploaded as Part 1 and Part 2.

USPTO, Non-Final Office Action, dated Aug. 1, 2013 for U.S. Appl. No. 13/452,608.

USPTO "Non-Final Office Action" mailed Sep. 14, 2012 for U.S. Appl. No. 12/635,138, filed Dec. 10, 2009.

USPTO "Non-Final Office Action" mailed Dec. 21, 2012 for U.S. Appl. No. 12/648,024, filed Dec. 28, 2009.

USPTO "Notice of Allowance" mailed Jun. 24, 2013 for U.S. Appl. No. 12/635,138.

US Patent and Trademark Office, Non-Final Office Action, dated Oct. 17, 2013 for U.S. Appl. No. 12/648,024.

* cited by examiner

IDENTIFYING INSTANCES OF MEDIA PROGRAMMING AVAILABLE FROM DIFFERENT CONTENT SOURCES

TECHNICAL FIELD

The following discussion generally relates to providing combined search results that identify instances of media programming satisfying received search criteria that are available from various content sources in a media distribution system.

BACKGROUND

Media content can now be received from any number of different sources. Broadcast television content, for example, can typically be received at set-top box (STB) or other receiver that receives a direct broadcast satellite (DBS), cable and/or terrestrial broadcast signal, and such received content may also be stored in a personal or digital video recorder (DVR) or the like for viewing at a later time ("time shifting"). Live or recorded content can also be "placeshifted" over the Internet or another network to allow viewing at remote locations away from the viewer's primary television set. In addition to the wide variety of options in viewing broadcast media content, even more content is increasingly becoming available "on demand" from any number of file based or streaming sources, including various network-based services that provide access to a wealth of on-demand programming.

As content becomes available from a multitude of sources, however, it can be increasingly difficult to locate related programming from different sources. Typically, different content sources provide media content using different techniques and/or formats. For example, each content provider may use a different format when providing metadata that describes the media content being made available by that respective content provider. Due to the wide variety of formats and content sources, locating related programming from different content sources can be a significant challenge. For example, if a viewer wishes to locate a particular program or episode, an online media distribution service may need to conduct separate searches of broadcast program guides, on-demand libraries, online video libraries, DVR contents and/or the like to try and find the desired program using the search criteria provided by the view. The wealth of content available and the variety of the metadata formats used by the various content sources further complicates such searches.

As a result, it is now desirable to create systems and methods for managing related media content from various content sources. Other desirable features and characteristics may also become apparent from the subsequent detailed description and the appended claims, taken in conjunction with the accompanying drawings and this background section.

BRIEF SUMMARY

According to various exemplary embodiments, systems and methods are presented for identifying instances of media programming available within a media distribution system. In one embodiment, a server includes a memory having stored therein a first listing of media programs available from a first content source, such as a user's digital video recorder, and a second listing of media programs available from a second content source, such as an on-demand or online programming source. The server also includes a processor coupled to the memory, wherein the processor receives search criteria indicative of a desired media program and identifies a media data object in the first listing corresponding to an instance of the desired media program that is available from the first content source. The processor obtains a program identifier from the identified media data object, identifies a second media data object in the second listing corresponding to another instance of the desired media program that is available from the second content source, and provides a combined search result that indicates availability of the desired media program from the first content source and the second content source.

In other embodiments, a media distribution system is provided that includes an associating server and a host server coupled to the associating server over a network. The associating server is configured to format each media data object of a plurality of media data objects received from a content source, such as an on-demand or online programming source, to include a respective program identifier associated with a respective media program corresponding to that respective media data object. The host server obtains the plurality of associated media data objects from the associating server, and receives search criteria indicative of a desired media program. The host server determines a target program identifier associated with the desired media program, and identifies a first media data object corresponding to the desired media program from the plurality of associated media data objects using the target program identifier.

In another embodiment, a method that is executable by a processing system is provided for identifying instances of a desired media program available within a media distribution system. The method involves searching a first listing of media programming available from a first content source using search criteria indicative of the desired media program to identify a first instance of the desired media program available from the first content source, obtaining a target program identifier associated with the desired media program from the first instance, identifying a second instance of the desired media program in a second listing of media programming available from a second content source using the target program identifier, and providing a combined search result that indicates availability of the desired media program from the first content source and the second content source.

Another embodiment of identifying instances of media programming available within a media distribution system involves obtaining a first media data object corresponding to a first media program available from a first content source in the media distribution system, formatting the first media data object to include a first identifier to associate the first media data object with the first media program, and searching media programming available from a second content source in the media distribution system using search criteria indicative of the first media program to identify a second media data object corresponding to the first media program available from the second content source, wherein the second media data object has the first identifier associated therewith. In response to identifying the second media data object based on the search criteria, the method continues by obtaining the first identifier from the second media data object, identifying the first media data object from media programming available from the first content source using the first identifier, and providing a combined search result that indicates availability of the first media program from the first content source and the second content source.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Embodiments of the subject matter described herein generally relate to identifying instances of a desired media program matching user-specified search criteria that are available from multiple different content sources within a media distribution system. As described in greater detail below, in an exemplary embodiment, a processing system, such as a host server, receives the search criteria provided by a user or viewer that is indicative of the desired media program from a client device communicating with the host server over a network. The host server searches for the search criteria in media programming available from a first content source in the media distribution system, such as the user's digital video recorder (DVR) or a broadcast source (e.g., using an electronic program guide), to identify an instance of the desired media program available from that content source. After identifying the desired media program from the first content source, the host server determines or otherwise obtains, from the identified instance of the desired media program available from the first content source, a target program identifier that is associated with or otherwise corresponds to the desired media program. The host server then utilizes that target program identifier to identify additional instances of the desired media program that are available from other content sources in the media distribution system, such as, for example, online programming sources and/or on-demand programming sources, and provides a combined search result to the user/viewer that indicates availability of the desired media program from various content sources within the media distribution system.

In accordance with one or more embodiments, a receiving server receives media data objects indicative of media programs available from online programming sources and formats the media data objects using a uniform format. An associating server then receives the uniformly formatted media data objects and formats them again to include, for each uniformly formatted media data object, one or more identifiers associated with the respective media program that media data object corresponds to. As described in greater detail below, for each media data object obtained by the associating server, the associating server determines the identifiers associated with its corresponding media program by matching one or more fields of metadata of the media data object to corresponding fields of metadata of a record in a database of media programs. The associating server then obtains the values for the identifiers from the matching record in the database and formats the media data object to include identifier fields having the obtained values, thereby associating each media object with a media program record in the database. The host server identifies instances of the desired media program available from the online programming sources by searching the associated media data objects obtained from the associating server and identifying those media data objects having values for their identifier fields that are equal to or otherwise match the target program identifier(s).

Figure 1:
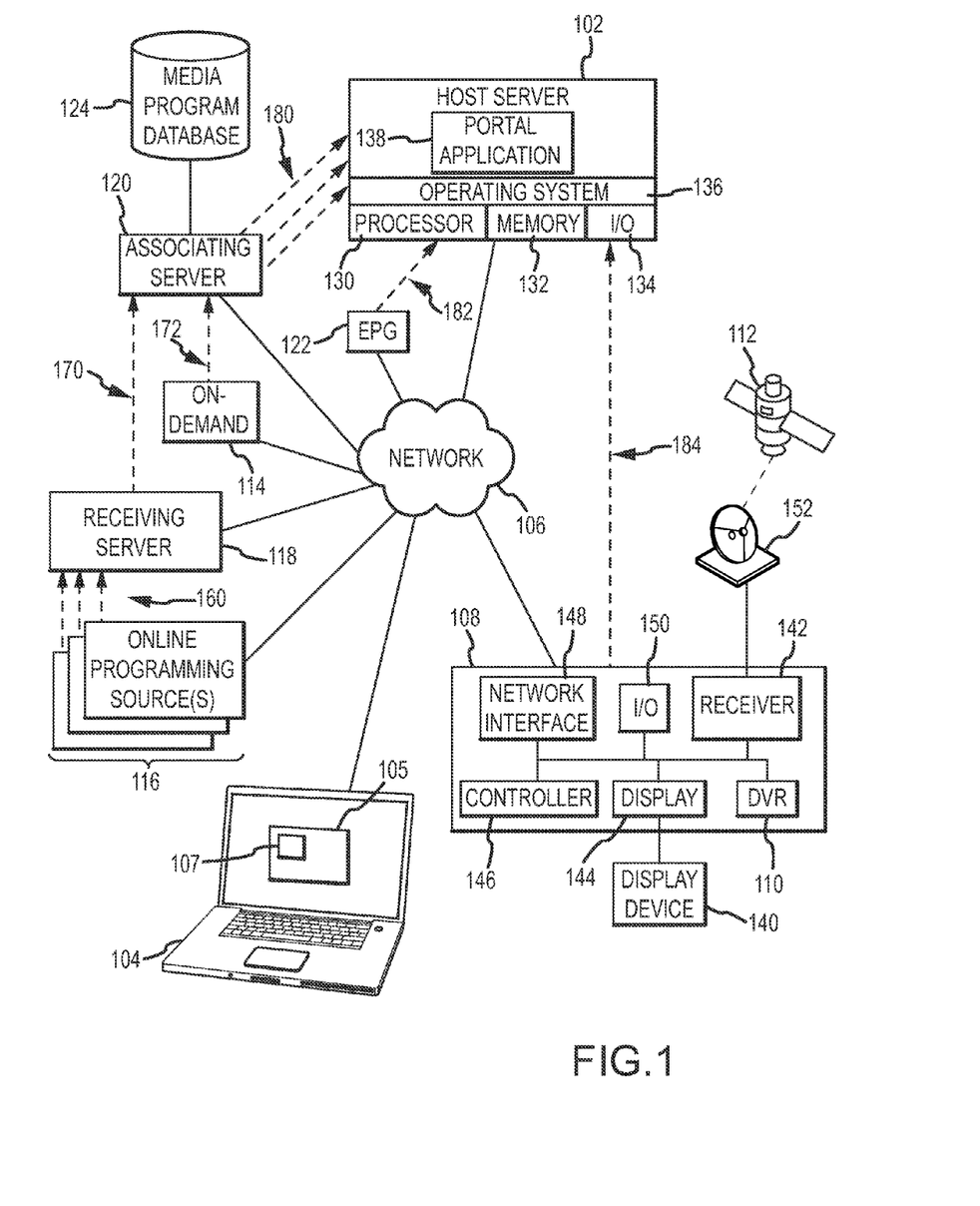
FIG. 1 is a block diagram of an exemplary media distribution system.

FIG. 1 depicts an exemplary embodiment of a media distribution system 100 for distributing media programs (or media content) from any number of content sources. As used herein, "media program" (or "program"), "media content" (or "content"), or variants thereof should be understood as referring to any audio, video, audio/visual or other programming in any streaming, file-based or other format. In various embodiments, media distribution system 100 distributes television, movie and/or other audiovisual programs in any digital format, such as MPEG, Windows Media, Adobe Flash, Quicktime, Real Media, H.264 and/or the like, over a network 106 for presentation to a user (or viewer) on a media playback device 104 (or client device), such as a desktop or notebook computer, mobile telephone, personal digital assistant, video game player, portable media player and/or any other device capable of receiving media programs via a network 106 and of rendering audio and/or visual content. The exemplary media distribution system 100 of FIG. 1 includes a host server 102 (or host) that communicates or otherwise interacts with the client device 104 (or client) over network 106 to provide a combined search result that identifies instances of media programs satisfying search criteria provided by a user of the client 104 that are available from different content sources within the media distribution system 100, such as, for example, instances of a desired media program stored by a media device 108 (e.g., on DVR 110), instances of the desired media program available from a broadcast source 112, instances of the desired media program available from an on-demand programming source 114, and/or instances of the desired media program available from one or more online programming sources 116.

In an exemplary embodiment, the media distribution system 100 includes a receiving server 118 that receives, via network 106, data and/or information 160 pertaining to media programming available from the online programming sources 116, formats the received data into a uniform format, and provides the formatted data 170 to an associating server 120. The associating server 120 receives, via network 106, the uniformly formatted data 170 from the receiving server 118 along with data and/or information 172 pertaining to media programming available from the on-demand programming source 114. For each instance of media programming received by the associating server 120, the associating server 120 determines one or more identifiers that may be used by the media distribution system 100 to uniquely identify its associated media program and formats the data object for that respective instance of the media program into another format that includes one or more fields having values equal to those identifiers. In this manner, the associating server 120 associates each instance of media programming received from receiving server 118 and/or on-demand source 114 with one or more identifiers used by the media distribution system 100 to obtain associated data 180 that may be provided to the host 102. The host 102 receives, via network 106, the associated data 180 from the associating server 120 along with data and/or information 184 pertaining to media programs stored by the media device 108 and data and/or information 182 pertaining to media programming available from the broadcast source 112 (e.g., using electronic program guide 122). In response to receiving search criteria from the client 104 indicative of a desired media program, the host 102 identifies an instance of the desired media program that is available from one content source within the media distribution system 100 (e.g., the DVR 110 or broadcast source 112), and then utilizes one or more identifiers associated with that instance of the desired media program to identify additional instances of the desired media program that are available from other content sources within the media distribution system 100 (e.g., on-demand programming source 114, online programming sources 116, or the like).

The client 104 may be any device, component, module, hardware, software application and/or the like that is capable of communicating with the host 102 over network 106. To that end, many different types of clients 104 may be implemented with any sort of general or special purpose hardware, software and/or firmware. In some embodiments, client 104 may be a conventional personal computer, portable computer, workstation and/or other computing system. In still other embodiments, some types of clients 104 may include personal digital assistants, video game players, mobile telephones, network appliances, remote controls, networked displays and/or any other devices capable of communicating on network 106.

In the embodiment shown in FIG. 1, client 104 executes any sort of conventional browser or other application 105 that is compatible with standard Internet, world wide web (WWW), transmission control protocol and/or internet protocol (TCP/IP), and/or other formats. Such browsers 105 are typically capable of displaying active or other documents formatted in accordance with published protocols (e.g., hypertext markup language (HTML), extensible markup language (XML), and/or the like). Many browsers 105 are also capable of executing "plugin" applications, applets or the like. Such plugins may be formatted in accordance with ActiveX, JAVA and/or any number of other formats. A number of commonly used web browsers are available for a number of different computing platforms, and the subject matter described herein is not limited to any particular browser application.

In some embodiments, client 104 further includes a media player application 107. This media player 107 may be a standalone player, or the media player 107 may be implemented as a plugin or other applet that runs within browser 105 as desired. In some embodiments, media player 107 is initially obtained from a networked host, such as host 102. The media player 107 may be retrieved on an as-needed basis in some embodiments, or may be stored at client 104 for subsequent execution. Some embodiments may not provide media viewing directly on client 104; such clients 104 may nevertheless be able to interact with host 102 to search for particular programming, to select programs to record, to change preferences, or to take other actions related to media device 108 as desired.

The network 106 is any digital or other communications network capable of transmitting messages between senders (e.g., client 104) and receivers (e.g., host 102). In various embodiments, network 106 includes any number of public or private data connections, links or networks supporting any number of communications protocols. Network 106 may include the Internet, for example, or any other network. Such networks may be based upon TCP/IP or other conventional protocols, although other embodiments may use any type of alternate or successor protocols, as desired. In various embodiments, network 106 may also incorporate a wireless and/or wired telephone network, such as a cellular communications network for communicating with mobile phones, personal digital assistants, and/or the like. Various embodiments of network 106 may also incorporate any sort of wireless or wired local area networks, such as one or more IEEE 802.3 and/or IEEE 802.11 networks.

In the illustrated embodiment, the host 102 generally represents one or more servers or another network host capable of interacting with a client 104 to facilitate communications between the client 104 and the media device 108 associated with the user or operator of the client 104 via the host 102, and also, to provide information to the client 104 regarding media programming available from various content sources within the media distribution system 100, such as, for example, broadcast sources 112, on-demand sources 114, online programming sources 116, or like, along with the user's DVR 110, as described in greater detail below. The host 102 may be implemented with a server computer system or data processing system that is based upon any processor, architecture and/or operating system, and will typically be implemented using any sort of conventional processing hardware 130, memory 132 and input/output features 134. Various embodiments may be implemented using dedicated or shared hardware servers; other implementations may make use of virtual server features as part of a "cloud computing" service, such as any of the cloud computing services provided by any number of providers. Although FIG. 1 shows a single host 102 for convenience, many practical embodiments of media distribution system 100 may provide a cluster or other collection of multiple hosts 102 to support any desired number of simultaneous connections to multiple clients 104 and/or multiple media devices 108. This cluster may also incorporate appropriate routing, load balancing, access and security mechanisms and or any number of other features. In various embodiments, each host 102 is an actual or virtual computer system executing an operating system 136 in conjunction with the processing hardware 130, memory 132 and/or I/O features 134 to provide a computing core that is capable of executing a portal application 138, as well as any number of daemons, processes, applications or other instance modules as desired. For example, a portal application 138 could execute as a daemon on host 102, with connections to separate clients 104 being managed as separate processes or instances that communicate with portal application 138 using features provided by operating system 136.

In an exemplary embodiment, the portal application 138 receives or otherwise obtains search criteria provided by the user and identifies instances of media programming satisfying the search criteria that are available within the media distribution system 100. In this regard, the portal application 138 may include a search engine configured to implement one or more search processes using user-specified search criteria, such as search process 400 described in greater detail below in the context of FIG. 4. As set forth below, the portal application 138 utilizes one or more identifiers obtained from an identified instance of media programming satisfying the search criteria that is available from one content source to identify additional instances of that media programming that are available from other content sources within the media distribution system 100. For example, the portal application 138 may identify a media program stored on the user's DVR 110 that satisfies the user's search criteria, and using one or more identifiers associated with the stored program, the portal application 138 may identify additional instances of that media program that are available from one or more other content sources 112, 114, 116 in the media distribution system 100. The portal application 138 provides a combined search result to the user (e.g., within browser 105) that indicates the availability of the desired media program satisfying the search criteria from the various content sources 110, 112, 114, 116 within the media distribution system 100, as described in greater detail below in the context of FIGS. 4-5.

In the illustrated embodiment, the media device 108 is any component, hardware and/or the like capable of receiving and processing media content. In some embodiments, media device 108 is a set-top box (STB) or similar system that is able to receive television programming and/or to record certain programs that can be viewed on a display device 140, such as a television, monitor, liquid crystal display (LCD), light emitting diode (LED) display, plasma display, or the like. Exemplary embodiments of media device 108 will therefore include a receiver interface 142 for receiving satellite, cable and/or broadcast programming signals from broadcast sources 112, as well as a data storage medium 110 (e.g., a hard disk, flash memory, or another suitable non-volatile data storage element) to support a digital video recorder (DVR) feature and/or functionality, a display interface 144 for providing imagery to the display device 140, and a controller 146 that directs the operations of the media device 108 as appropriate. For convenience, but without limitation, the data storage medium 110 is alternatively referred to herein as a DVR. Media device 108 may also include an interface 148 to network 106 and/or an input/output interface 150 to a remote control or other device for providing user inputs to media device 108, as appropriate.

The components in media device 108 may be provided within a common chassis or housing as shown in FIG. 1, although equivalent embodiments may implement media device 108 with any number of inter-connected but discrete components or systems. For example, in some embodiments, the media device 108 may be realized as a combination of a STB and a placeshifting device, wherein some features of the media device 108 (e.g., the DVR 110, the receiver 142, the display interface 144, and/or I/Os 150) are implemented by the STB and other features of the media device 108 (e.g., the network interface 148) are implemented by the placeshifting device, wherein the placeshifting device works in conjunction with the STB to shift the viewing experience from a home television (e.g., display device 140) to a viewing display on the client device 104 (e.g., media player application 107) that is accessed via network 106. Examples of placeshifting devices that may be used in some embodiments of media device 108 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 108 may be a hybrid DVR and/or receiver, for example, that also provides transcoding and placeshifting features. Examples of conventional placeshifting functions, features, systems and structures are described in United States Patent Publication No. 2006/0095471, although the features described herein could be equivalently applied with any number of other techniques and structures in addition to those described in that particular publication. It should be appreciated that FIG. 1 depicts merely one exemplary embodiment of a media device 108, and in practice, the media device 108 may be logically and physically implemented in any manner to suit the needs of a particular embodiment.

In the exemplary embodiment illustrated in FIG. 1, media device 108 is capable of receiving digital broadcast satellite (DBS) signals transmitted from a broadcast source 112, such as a satellite, using an antenna 152 that provides received signals to the receiver 142. Equivalent embodiments, however, could receive programming at receiver 142 from any sort of cable connection, broadcast source, removable media, network service, external device and/or the like. The DVR 110 feature stores recorded programming (e.g., broadcast programming received via receiver 142) on a hard disk drive, memory, a networked server, or other storage medium as appropriate in response to user/viewer programming instructions, wherein the recorded programming may be subsequently viewed on display device 140 or client device 104 via network 106. Content stored in DVR 110 may be any sort of file-based programming or other content that is accessible to media device 108. In various embodiments, in addition to storing broadcast programming, the DVR 110 may also store programming received from another source within the media distribution system 100, such as, for example, programming downloaded from a video on-demand server. Additionally, content in DVR 110 may be stored in any sort of compressed or uncompressed format, as desired, and may be encoded or transcoded as desired for effective receipt, storage, retrieval and playing.

Controller 146 is any sort of hardware, software and/or firmware capable of directing the operations of media device 108. In various embodiments, controller 146 includes software or firmware logic residing in memory and executing on any sort of processor, such as any sort of microprocessor, microcontroller, digital signal processor or the like. In various embodiments, the controller 146 is based upon a "system on a chip" (SoC) implementation that incorporates a hybrid microcontroller with memory, input/output and other features to perform the various signal processing and other actions of media device 108. Other embodiments may implement controller 146 and/or the other features of media device 108 with any number of discrete and/or integrated processing components (e.g., any sort of microprocessor or microcontroller), memories, input/output features and/or other features as desired.

In an exemplary embodiment, a user of the client 104 is able to connect to the portal application 138 supported by host 102 via the network 106, for example, by directing a browser 105 or similar program to a URL or other address associated with host 102 and/or portal application 138. After the user is successfully authenticated by the portal application 138, the host 102 and/or portal application 138 establishes a connection to the media device 108 that is associated with the user. This connection is used to obtain information about programming stored at the media device 108, such as, for example, a listing of the programs stored on DVR 110. Although not illustrated in FIG. 1, the media distribution system 100 may employ one or more intermediate messaging servers adapted to facilitate communications between the host 102 and the media device 108 to establish a direct connection that is not interfered with by firewalls or other security mechanisms that may be implemented by the network 106 and/or media device 108.

In the illustrated embodiment, the online programming sources 116 generally represent providers of media programs for consumption over network 106, and in various embodiments, the online programming sources 116 may include studios or other content creators, syndicators or other content distributors, television networks, production houses, web or other network-based distributors, and/or any number of other sources as desired. Each online programming source 116 may be implemented or realized using any combination of devices, components, modules, servers, hardware, software applications and/or the like that is capable of providing information pertaining to the media programs provided by the respective online programming source 116. In an exemplary embodiment, each online programming source 116 provides a listing of media programs available from the respective online programming source 116 (e.g., by publishing a data feed 160 or making available one or more folders that includes a listing of media programs). For each respective media program available from the online programming source 116, the data feed 160 includes a corresponding media data object representative of the respective media program that includes fields for metadata and/or other information pertaining to the respective media program, such as, for example, the primary title or series title of the media program, a secondary title or episode title of the media program, actors and/or actresses featured in the media program, and/or other descriptive information, along with other attributes pertaining to the media program, such as runtimes, ad points, bit rates and/or frame rates, sampling rates, and/or resource location information (e.g., a URL or IP address where the media program can be streamed and/or downloaded from). In practice, each online programming source 116 may provide media data objects in a different format than other online programming sources 116. For example, one online programming source 116 may provide media data objects in the Media RSS (MRSS) format, another online programming source 116 may provide media data objects in XML format, and yet another online programming source 116 may provide media data objects in a comma-separated values (CSV) format.

In an exemplary embodiment, the on-demand programming source 114 generally represents a provider of media programs for consumption over network 106 on a pay-per-view basis (although some media programs provided by the on-demand programming source 114 may be free), and may be realized as any combination of devices, components, modules, servers, hardware, software applications and/or the like that is capable of providing information pertaining to the media programs provided by the on-demand programming source 114. As described above, the on-demand programming source 114 provides a data feed 172 that includes a listing of media programs available on a pay-per-view basis from the on-demand programming source 114, wherein for each respective media program available from the on-demand programming source 114, the data feed 172 includes a corresponding media data object representative of the respective media program that includes fields for metadata and/or other descriptive information pertaining to the respective media program along with other attributes pertaining to the media program (e.g., pricing and/or availability information). In some embodiments, the on-demand programming source 114 provides media data objects in a format that is different from the formats used by the online programming sources 116. For example, the on-demand programming source 114 may provide media data objects in the XML format while the online programming sources 116 provide media data objects in the MRSS format. In other embodiments, the on-demand programming source 114 may provide media data objects in the same format as the online programming sources 116.

Still referring to FIG. 1, in an exemplary embodiment, the media distribution system 100 includes an electronic program guide 122, which may be realized as a server, a database, or another device operating on the network 106 that maintains information pertaining to current and/or future broadcasts (or airings) of media programs that are available to be received from broadcast source 112 (e.g., by media device 108 via receiver 142). Such program guides are available from Tribune Media Services and many other suppliers as appropriate. Additionally, the media distribution system 100 includes a media program database 124 that includes verified or validated metadata and/or other descriptive information for a vast array of media programs. For example, the media program database 124 may contain metadata and/or other descriptive information pertaining to substantially all of the media programs that may be available from one or more content sources within media distribution system 100 (e.g., information pertaining to any media programs that have previously been aired by a broadcast source 112, along information pertaining to any movie that has been presented in theaters, made available on-demand, or released for individual use (e.g., on digital video disc (DVD) or the like)). Such metadata databases are available from Tribune Media Services and many other suppliers as appropriate. For each media program having a record (or entry) in the media program database 124, the media program database 124 maintains a media data object that includes fields of metadata associated with that media program along with fields of program identifiers that may be used to identify that media program record, as described in greater detail below. In an exemplary embodiment, the program guide 122 and the media program database 124 are cooperatively configured such that the program guide 122 and the media program database 124 use the same program identifiers to uniquely identify each media program.

In the illustrated embodiment, the receiving server 118 is configured to obtain or otherwise receive the data feeds 160 provided by the online programming sources 116, uniformly format the data objects provided by the online programming sources 116 into a common format, and provide a data feed 170 containing the uniformly formatted media data objects to the associating server 120, as described in greater detail below in the context of FIG. 2. The associating server 120 is configured to obtain or otherwise receive the uniformly formatted data feed 170 provided by the receiving server 118 along with the data feed 172 provided by the on-demand programming source 114, format the media data objects provided by the on-demand programming source 114 and/or receiving server 118 to include, for each media data object, fields for the program identifiers used by media program database 124 to identify its associated media program, and provide one or more data feeds 180 that contain associated media data objects corresponding to online media programs available from online programming sources 116 and on-demand media programs available from on-demand programming source 114, as described in greater detail below in the context of FIG. 3. The host 102 obtains or otherwise receives the associated data objects provided by the associating server 120, and utilizes the program identifiers to identify instances of a desired media program that are available from the online programming sources 116 and/or on-demand source 114, as described in greater detail below in the context of FIG. 4.

In the illustrated embodiment of FIG. 1, the receiving server 118, the associating server 120, and the host 102 are each realized as discrete components in the media distribution system 100. In this regard, the receiving server 118 may be realized as one or more servers, devices, components, modules, hardware, software applications, or the like operating on the network 106 to perform the functionality described herein, and the associating server 120 may be realized as a separate arrangement of one or more servers, devices, components, modules, hardware, software applications, or the like operating on the network 106 to perform the functionality described herein. It should be noted, however, that in other embodiments, the receiving server 118 may be integrated with and/or otherwise implemented using the same hardware as associating server 120 and/or host 102, and likewise, the associating server 120 may be integrated with and/or otherwise implemented using the same hardware as host 102. For example, the host 102, receiving server 118, and associating server 120 may each be implemented as a virtual server that shares hardware resources with and/or operates on the same physical hardware as the other virtual servers.

Figure 2:
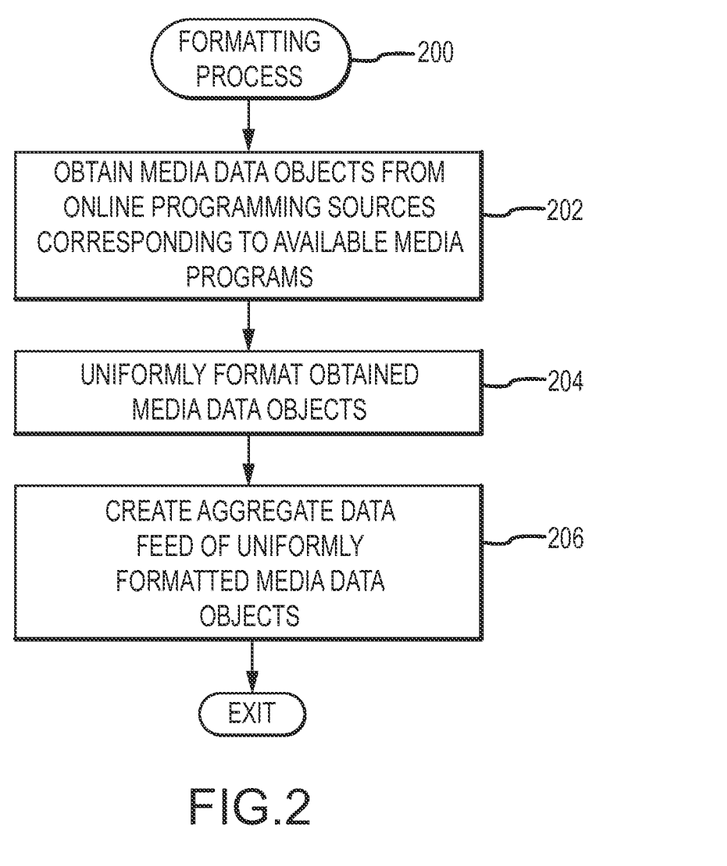
FIG. 2 is a flowchart of an exemplary formatting process suitable for use with the media distribution system of FIG. 1.

Referring now to FIG. 2, in an exemplary embodiment, a media distribution system 100 may be configured to perform a formatting process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the media distribution system 100. That said, in exemplary embodiments, the formatting process 200 is performed by the receiving server 118. It should be appreciated that any number of additional or alternative tasks may be included, and may be incorporated into a more comprehensive procedure or process having additional functionality not described in detail herein.

Referring to FIG. 2, and with continued reference to FIG. 1, the formatting process 200 begins by obtaining media data objects corresponding to media programs available from one or more content sources within a media distribution system (task 202). In an exemplary embodiment, the receiving server 118 obtains, from each online programming source 116 within the media distribution system 100, media data objects corresponding to media programs that have been recently provided or otherwise made available by the respective online programming source 116. For example, each online programming source 116 may publish a data feed 160 (or a folder) that contains media data objects corresponding to all of the media programs that are currently available for consumption from that online programming source 116. For each respective online programming source 116, the receiving server 118 accesses or otherwise monitors its data feed 160 (or folder), identifies recently added media data objects, and downloads or otherwise obtains those media data objects from the respective online programming source 116. In this regard, the receiving server 118 may periodically poll the data feeds 160 (or folders) provided by the online programming sources 116 at regular intervals and use the timestamps of the media data objects made available by the online programming sources 116 to identify or otherwise determine those media data objects that have been recently made available by a respective online programming source 116 in the time period after the preceding polling of that respective online programming source 116. For each online programming source 116, the receiving server 118 may compile a list or other data structure that consists of the all of the media data objects obtained from that online programming source 116.

In an exemplary embodiment, after obtaining media data objects corresponding to available media programs, the formatting process 200 continues by uniformly formatting each of the obtained media data objects (task 204). As described above, each online programming source 116 may provide media data objects that are formatted in accordance with a different formatting standard (e.g., XML, MRSS, CSV, and the like). For each online programming source 116, the receiving server 118 may execute one or more scripts determine or otherwise identify the particular format that is used by that respective online programming source 116. After determining the format used by an individual online programming source 116, the receiving server 118 executes one or more additional scripts to parse the data structure of media data objects obtained from that online programming source 116, and for each obtained media data object, convert that media data object from the format used by that online programming source 116 to a uniform format used for all of the media data objects obtained from the online programming sources 116. For example, in accordance with one embodiment, the receiving server 118 formats all of the media data objects received from the online programming sources 116 into the MRSS format, wherein for online programming sources 116 providing media data objects in a format other than the MRSS format, the receiving server 118 executes one or more scripts that map or otherwise translate the fields of metadata for the media data objects provided by those online programming sources 116 to the appropriate locations of those fields in corresponding MRSS media data objects.

After uniformly formatting the obtained media data objects, the formatting process 200 continues by aggregating or otherwise combining the uniformly formatted media data objects to create a single data feed of uniformly formatted media data objects (task 206). For example, after converting each obtained media data object from each online programming source 116 into the uniform format, the receiving server 118 may concatenate or otherwise combine the data structures of uniformly formatted media data objects to create a single data feed 170 of uniformly formatted media data objects. In this regard, all of the media data objects in the data feed 170 have the same format. As described in greater detail below, the data feed 170 is made available or otherwise provided to the associating server 120 for subsequent data management and/or processing.

Figure 3:
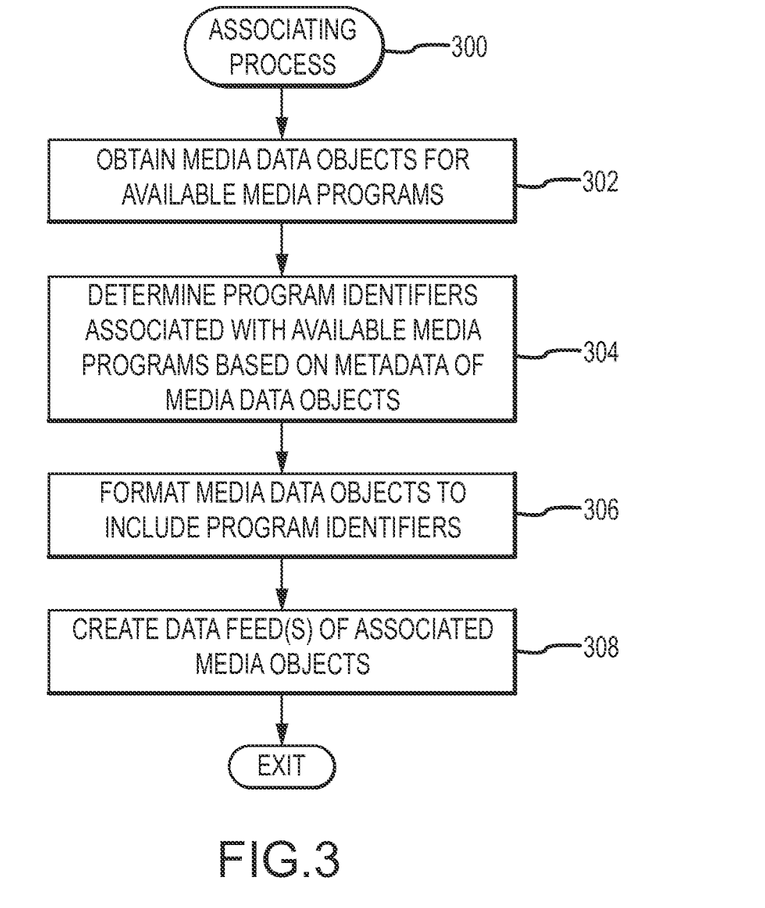
FIG. 3 is a flowchart of an exemplary associating process suitable for use with the media distribution system of FIG. 1.

Referring now to FIG. 3, in an exemplary embodiment, a media distribution system 100 may be configured to perform an associating process 300 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the media distribution system 100. That said, in exemplary embodiments, the associating process 300 is performed by the associating server 120. It should be appreciated that any number of additional or alternative tasks may be included, and may be incorporated into a more comprehensive procedure or process having additional functionality not described in detail herein.

Referring to FIG. 3, and with continued reference to FIGS. 1-2, the associating process 300 begins by obtaining media data objects corresponding to media programs available from one or more content sources within a media distribution system (task 302). In an exemplary embodiment, the associating server 120 obtains, from receiving server 118, uniformly formatted media data objects corresponding to media programs that have been recently provided or otherwise made available by the online programming sources 116. As described above, the receiving server 118 creates and publishes a data feed 170 that contains media data objects corresponding to media programs available from online programming sources 116 that are in a uniform format. The associating server 120 accesses or otherwise monitors the data feed 170, identifies the recently added media data objects, and downloads or otherwise obtains those media data objects from the receiving server 118. As described above, the associating server 120 may periodically access the data feed 170 at regular intervals and use timestamps to identify or otherwise determine those media data objects that have been added to the data feed 170 in the time period after the preceding polling of the data feed 170. The associating server 120 downloads the identified media data objects from the data feed 170 and maintains a list or other data structure that consists of the media data objects obtained from the receiving server 118 and/or data feed 170. In an exemplary embodiment, the on-demand programming source 114 also provides a data feed 172 (or publishes a folder) that contains media data objects corresponding to all of the media programs that are currently available from on-demand programming source 114, wherein the associating server 120 accesses or otherwise monitors the data feed 172, identifies the recently added media data objects, downloads or otherwise obtains those media data objects from the on-demand programming source 114, and maintains a list or other data structure that consists of the media data objects obtained from the on-demand programming source 114 and/or data feed 172 in a similar manner as described above for receiving server 118 and/or data feed 170.

In an exemplary embodiment, the associating process 300 continues by determining or otherwise identifying, for each newly obtained media data object, one or more program identifiers associated with the media program corresponding to that respective media data object, and formats that media data object into a different format that includes fields for the program identifiers associated with its associated media program (tasks 304, 306). In this regard, each media program has a set of one or more program identifiers that are unique to that media program, such that each media program may be distinguished from other media programs and uniquely identified based on those program identifiers. As described above, in an exemplary embodiment, the program identifiers are used by the media program database 124 to index media programs and associate metadata and/or other descriptive information with the appropriate media programs. For example, for each media program, the media program database 124 includes a media data object having fields for the metadata and/or descriptive information for that media program along with one or more fields corresponding to the program identifiers for that media program, wherein the combination of values for those program identifier fields are unique to that media program.

In an exemplary embodiment, the associating server 120 analyzes one or more metadata fields of each newly obtained media data object from receiving server 118 and/or on-demand programming source 114 to match that respective media data object to its associated media program in the media program database 124. For example, for an individual media data object obtained from receiving server 118, the associating server 120 may obtain a subset of the metadata associated with that media data object (e.g., a series title, an episode title, a lead actor/actress, or the like) and perform one or more algorithms to match that subset of metadata to the metadata associated with an individual media data object in the media program database 124. After matching the subset of the metadata for the obtained media data object to an individual media data object in the media program database 124, the associating server 120 formats the obtained media data object into a different format to include one or more program identifier fields, obtains the values of the program identifier fields of the matching media data object in the media program database 124, and substitutes or otherwise utilizes the obtained values for the program identifier fields of the matching media data object in media program database 124 as the values for the program identifier fields of the newly formatted media data object. In this manner, the obtained media data objects are associated with the metadata and/or descriptive information for its associated media program that is maintained by the media program database 124 based on the values of its program identifier fields. In addition to program identifier fields, the associating server 120 may format the obtained media data object to include additional identifier fields (e.g., genre identifier fields), obtain the values of those additional identifier fields from the matching media data object in the media program database 124, and substitute or otherwise utilize the obtained values as the values for those identifier fields of the obtained media data object. In an exemplary embodiment, the associating server 120 repeats the steps of obtaining a subset of metadata associated with an obtained media data object, matching that subset of metadata to metadata associated with an individual media data object in the media program database 124, and formatting the obtained media data object into a different format that includes one or more program identifier fields corresponding the matching media data object in media program database 124 for each media data object obtained from data feed 170 (or receiving server 118) and for each media object obtained from data feed 172 (or on-demand programming source 114). It should be noted that by virtue of the media data objects provided by data feed 170 being uniformly formatted, the associating server 120 may more readily identify and obtain values of the desired metadata fields to be used to match the obtained media data objects to records in the media program database 124 when matching media data objects from data feed 170 to records in media program database 124.

In an exemplary embodiment, the associating process 300 continues by creating one or more data feeds containing associated media data objects (task 308). In this regard, the associating server 120 combines the associated media data objects obtained from the data feeds 170, 172 and/or content sources 114, 116 to create data feeds 180 of media data objects that are associated with records in media program database 124. For example, the associating server 120 may provide one data feed containing media data objects corresponding to media programs available from online programming sources 116 and another data feed containing media data objects available from the on-demand programming source 114. Additionally, the associating server may provide a data feed containing media data objects corresponding to the media programs maintained in the program database 124. As described in greater detail below, the data feeds 180 are made available or otherwise provided to the host server 102. In this manner, each media data object provided to the host 102 from the associating server 120 includes one or more program identifier fields that associate it with the record for its associated media program in the media program database 124, and by virtue of the same program identifiers being used by the media program database 124 and program guide 122 as described above in the context of FIG. 1, each media data object provided to the host 102 from the associating server 120 is also associated with instances of its associated media program available from broadcast sources 112 and/or the user's DVR 110. As set forth below, the host server 102 utilizes the program identifier fields to identify instances of media programs satisfying user-specified search criteria that are available from different sources within the media distribution system 100 rather than searching each respective content source using the search criteria in an attempt to match the search criteria to the metadata of the media data objects provided by each respective content source.

Figure 4:
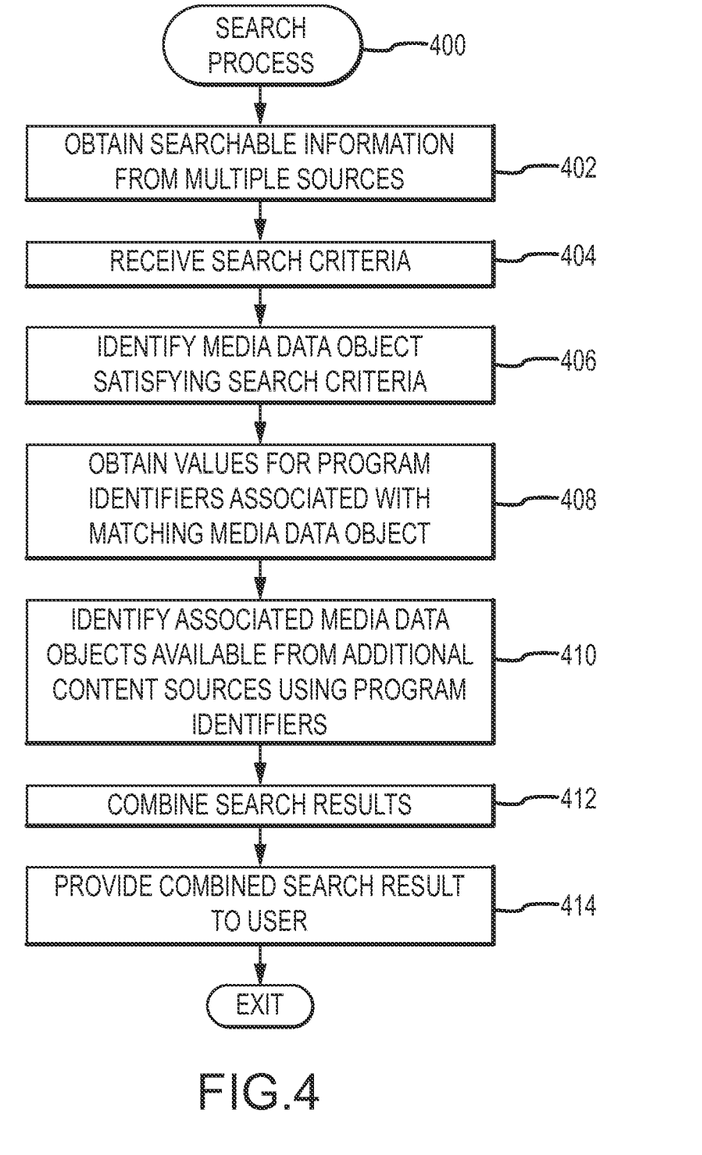
FIG. 4 is a flowchart of an exemplary search process suitable for use with the media distribution system of FIG. 1.

Referring now to FIG. 4, in an exemplary embodiment, a media distribution system 100 may be configured to perform a search process 400 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the media distribution system 100. That said, in exemplary embodiments, the search process 400 is performed by the host server 102 and/or portal application 138. It should be appreciated that any number of additional or alternative tasks may be included, and may be incorporated into a more comprehensive procedure or process having additional functionality not described in detail herein.

Referring to FIG. 4, and with continued reference to FIGS. 1-3, the search process 400 begins by receiving or otherwise obtaining searchable information pertaining to the various media programs available from the various content sources within a media distribution system (task 402). In an exemplary embodiment, the host server 102 obtains, from associating server 120, the associated media data objects corresponding to media programs that are provided or otherwise made available by the on-demand programming source 114 and/or online programming sources 116. For example, the host server 102 may access or otherwise monitor the data feeds 180, identify recently added media data objects in the various data feeds 180, download or otherwise obtain those media data objects from the associating server 120, and store the downloaded media data objects locally (e.g., in memory 132) to create local representations of the data feeds 180 that mirror or otherwise contain all of the media data objects of data feeds 180. In a similar manner as described above, the host server 102 may periodically access the data feeds 180 at regular intervals and use timestamps to identify or otherwise determine those media data objects that have been modified or added to the data feeds 180 in the time period after the preceding polling of the data feeds 180. The host server 102 downloads the identified media data objects from the data feeds 180 and maintains, in memory 132, lists or other data structures that consists of the media data objects obtained from the associating server 120 and/or data feeds 180. In this manner, the host server 102 obtains and maintains listings of media data objects provided by the online programming sources 116 and on-demand programming source 114, wherein the fields of metadata and/or other descriptive information of the media data objects provide searchable information pertaining to the media programs available from the online programming sources 116 and on-demand programming source 114. In the illustrated embodiment, the program guide 122 also provides a data feed 182 (or publishes a folder) that contains media data objects corresponding to all of the media programs that are either currently available from broadcast sources 112 or will be available from broadcast sources 112 within a predetermined amount of time (e.g., within the next two weeks). Likewise, the host server 102 accesses or otherwise monitors the data feed 182 (or folder), identifies the recently added media data objects, downloads or otherwise obtains those media data objects from the program guide 122 and/or data feed 182, and stores or otherwise maintains (e.g., in memory 132) a listing of media data objects provided by the program guide 122, wherein the fields of metadata and/or other descriptive information of the media data objects provide searchable information pertaining to the media programs available from the broadcast source 112.

In an exemplary embodiment, the host server 102 also obtains a listing of the stored media programs on the user's DVR 110 and/or media device 108. For example, after the portal application 138 successfully authenticates the user, the host 102 and/or portal application 138 establishes a connection to the media device 108 that is associated with the user, downloads or otherwise obtains media data objects corresponding to the media programs stored at the media device 108 and/or DVR 110, and stores or otherwise maintains (e.g., in memory 132) the downloaded media data objects to create a local representations of the stored media programs on the media device 108 and/or DVR 110. Thus, after a user has been authenticated by the portal application 138, the host 102 and/or portal application 138 will have obtained or otherwise have access to a listing of media data objects from media device 108 and/or DVR 110 corresponding to the user's stored media programs, in addition to the listing of media data objects from program guide 122 corresponding to media programs that are or will be available from broadcast source 112, the listing of media data objects from associating server 120 corresponding to media programs that are available from on-demand programming source 114, and the listings of media data objects from associating server 120 corresponding to media programs that are available from online programming sources 116.

In an exemplary embodiment, the search process 400 continues by receiving search criteria from the user (task 404). For example, the portal application 138 may provide or otherwise display on the client 104 (e.g., within browser 105) a graphical user interface element, such as a text box, adapted to receive user input indicative of desired search criteria. Subsequently, the user of the client device 104 may provide desired search criteria, which typically includes one or more pieces of metadata that are indicative of a desired media program, such as, for example, a movie title, a television series title, an episode title, an actor/actress name, or the like.

After receiving search criteria, the search process 400 continues by identifying a media data object satisfying the received search criteria (task 406). In this regard, the portal application 138 searches for a media data object that matches (or most closely matches) the search criteria. For example, as described above, the media distribution system 100 of FIG. 1 includes a media program database 124 that that includes verified or validated metadata for substantially every media program that could possibly be provided by one of the content sources in the media distribution system 100. In such embodiments, the portal application 138 may access the local representation of the data feed 180 obtained from associating server 120 corresponding to the media program database 124, and perform various searching logic and algorithms to match a media data object in the media program database 124 to the search criteria. In other embodiments, the portal application 138 may search a content source within the media distribution system 100 that is likely to have higher quality metadata associated with its media data objects, such as the DVR 110 or program guide 122. In yet other embodiments, the user may identify a desired content source (e.g., DVR 110) to be searched. In such embodiments, the portal application 138 may initially access the local representation of the media data objects obtained from media device 108 and/or DVR 110 corresponding to the user's stored media programs, and perform various searching logic and algorithms to match a media data object obtained from the media device 108 and/or DVR 110 to the search criteria. If the portal application 138 fails to identify a media data object matching the search criteria from a desired (or default) content source, the portal application 138 may proceed by searching for a media data object matching the search criteria from the media program database 124 or another content source within the media distribution system 100 that is most likely to have a media data object matching the search criteria.

In response to identifying a media data object satisfying the received search criteria from a first content source in the media distribution system, the search process 400 continues by obtaining the program identifiers associated with the matching media data object and identifying associated media data objects available from other content sources in the media distribution system using the obtained program identifiers (tasks 408, 410). As described above, in an exemplary embodiment, each media program has a set of one or more program identifiers that may be utilized by the media program database 124 and/or program guide 122 to uniquely identify that media program, and each media data object corresponding to media programs available from on-demand programming source 114 and online programming sources 116 obtained from the associating server 120 includes the program identifiers corresponding to its associated media program by virtue of the associating process 300 described above. In this regard, in response to identifying a media data object satisfying the search criteria, the portal application 138 and/or host server 102 determines target program identifiers for searching the other content sources in the media distribution system 100 by obtaining the program identifiers of the matching media data object, and performs various searching logic and algorithms on the media data objects corresponding to media programs available from the other content sources in the media distribution system 100 to identify instances of media programs having values for the program identifier fields that match the target program identifiers that are available from other content sources within the media distribution system 100. For example, in response to identifying a media data object in the media program database 124 having metadata that satisfies or otherwise matches the search criteria, the portal application 138 and/or host server 102 obtains the program identifiers of the matching media data object for use as target program identifiers, and performs various searching logic and algorithms on the media data objects corresponding to media programs available from the other content sources 110, 112, 114, 116 in the media distribution system 100 to identify media data objects having values for the program identifier fields equal to the target program identifiers. In this manner, the portal application 138 and/or host server 102 may expeditiously identify all of the instances of the desired media program satisfying the user's search criteria that are available from the various content sources 110, 112, 114, 116 within the media distribution system 100 without having to search for the search criteria the metadata fields of the media data objects provided by each respective content source 110, 112, 114, 116.

For example, if the user searches for "Citizen Kane", the portal application 138 and/or host server 102 identifies the media data object in media program database 124 having a title field that matches "Citizen Kane" and obtains the values for the program identifiers for that matching media data object. The portal application 138 and/or host 102 searches the listing of media data objects obtained from program guide 122 for any media data objects having values for their program identifier fields that are equal to the values obtained for the "Citizen Kane" object in media program database 124 to identify any current or future airings of "Citizen Kane" that may be viewed and/or recorded from broadcast source 112. Likewise, the portal application 138 searches the listing of media data objects obtained from DVR 110 for any media data objects having values for their program identifier fields that are equal to the values obtained for the "Citizen Kane" object in media program database 124 to identify any instances of "Citizen Kane" that are stored on the user's DVR 110, searches the listing of media data objects obtained from on-demand programming source 114 for any media data objects having values for their program identifier fields that are equal to the values obtained for the "Citizen Kane" object in media program database 124 to identify any instances of "Citizen Kane" that are available on-demand, and searches the listing of media data objects obtained from online programming sources 116 for any media data objects having values for their program identifier fields that are equal to the values obtained for the "Citizen Kane" object in media program database 124 to identify any instances of "Citizen Kane" that are available online.

Referring again to FIG. 4, and with continued reference to FIGS. 1-3, the search process 400 continues by aggregating or otherwise combining the media data objects available from various content sources in the media distribution system that satisfy the search criteria to obtain a combined search result and providing the combined search result to the user (tasks 412, 414). In this regard, the portal application 138 and/or host server 102 may create an aggregate listing of media data objects satisfying the search criteria by concatenating or otherwise combining the associated media data objects identified from the various content sources in the media distribution system 100 with the initially matched media data object. After the portal application 138 and/or host server 102 has searched each of the content sources 110, 112, 114, 116 in the media distribution system 100, the portal application 138 and/or host server 102 presents or otherwise displays the combined search result on the client device 104 (e.g., within browser 105). In this regard, the portal application 138 may redirect to or otherwise present a web page within browser 105 that visually presents each instance the media program satisfying the search criteria in association with the respective content source that instance of the media program is available from. For example, the portal application 138 may display a webpage that lists instances of "Citizen Kane" available on the user's DVR 110 and/or media device 108, followed by any current or upcoming airings of "Citizen Kane" that will be available from broadcast source 112, followed by on-demand offerings of "Citizen Kane" available from on-demand programming source 114 and/or any online offerings of "Citizen Kane" available from online programming sources 116. It should be appreciated that the presentation of the instances of matching media programs may be performed in a variety of different manners, and the matching media programs available from the content sources within the media distribution system 100 may be ordered in various ways (e.g., to suit the preferences of the user). Accordingly, the subject matter described herein is not intended to be limited to any particular manner of presenting the combined search results to the user.

Figure 5:
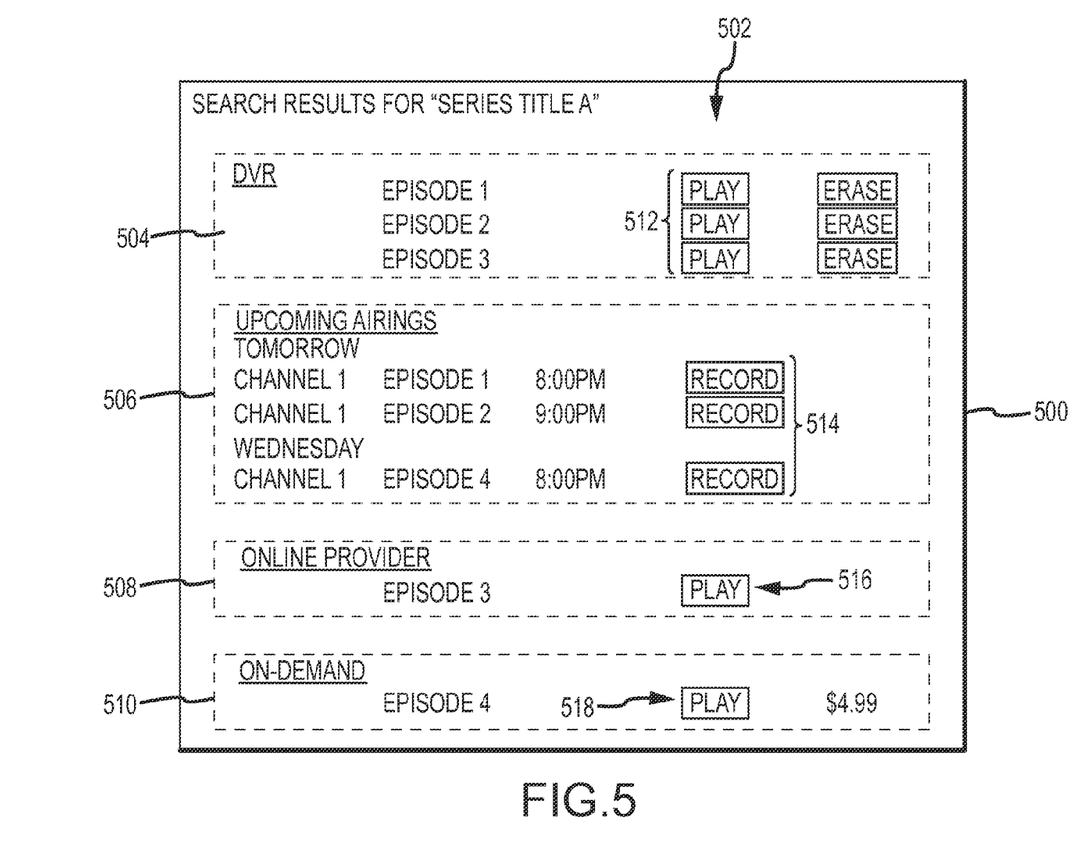
FIG. 5 is an exemplary user interface display illustrating the results of the search process of FIG. 4 in accordance with one embodiment.

Referring to FIG. 5, and with continued reference to FIGS. 1-4, user interface display 500 that may be presented by the portal application 138 (e.g., within browser 105) that includes a graphical representation of a combined search result 502 for a particular media program, such as television series "Series Title A." As described above, to obtain the combined search result 502, the portal application 138 and/or host server 102 may initially search the local representation of the data feed 180 corresponding to media program database 124 for a media data object having metadata (e.g., a series title field) matching or otherwise corresponding to "Series Title A" and obtains the values for the program identifiers for that matching media data object. Using the values for the program identifiers corresponding to "Series Title A", the portal application 138 searches the listing of media data objects available from the user's DVR 110, online programming sources 116, on-demand programming source 114, and broadcast source 112 (e.g., using media data objects obtained from program guide 122) to identify any media data objects having values for their program identifier fields that are equal to the target program identifier values obtained from the "Series Title A" object in media program database 124. The portal application 138 aggregates all the instances of media data objects associated with the "Series Title A" object in media program database 124, and presents or otherwise displays the combined search result 502 on the client device 104 (e.g., within browser 105). As illustrated, the portal application 138 may present instances of "Series Title A" that are recorded on DVR 110 in a first region 504 of the display 500, present instances of "Series Title A" available from broadcast source 112 in a second region 506 of the display 500, present instances of "Series Title A" available from an online programming source 116 in a third region 508 of the display 500, and present instances of "Series Title A" available on-demand from on-demand programming source 114 in a fourth region 510 of the display 500. As noted above, the combined search result may be presented in a variety of different manners, and the subject matter described herein is not intended to be limited to any particular manner of presenting combined search results to the user.

A user may utilize the combined search result 502 to make a determination as to the manner in which he/she would like to view the desired media program. For example, in some situations, the user may desire to view a stored recording of the "Series Title A" from the user's DVR 110, in which case, the user may interact with the media device 108 and/or DVR 110 over the network 106 using graphical user interface elements 512 displayed by the portal application 138 to indicate a desire to placeshift and view a stored instance of "Series Title A" on the client device 104. In response to a user indicating a desire to play an episode of "Series Title A", the portal application 138 creates a placeshifting session by establishing a connection between the client device 104 and the media device 108 to stream or otherwise present the recorded episode on the DVR 110 and/or media device 108 to the user within media player 107. In other situations, the user may desire to record an upcoming airing of an episode of "Series Title A" on the user's DVR 110, in which case, the user may interact with the media device 108 and/or DVR 110 over the network 106 using graphical user interface elements 514 displayed by the portal application 138 to indicate a desire to record an upcoming episode of "Series Title A" on the user's DVR 110. In response to a user indicating a desire to record an upcoming episode of "Series Title A", the portal application 138 communicates with the media device 108 and/or DVR 110 to schedule a recording of the selected airing. In yet other situations, the user may desire to view the desired media program from a online programming source 116 or the on-demand programming source 114, in which case, the user may utilize graphical user interface elements 516, 518 presented by the portal application 138 to interact with the desired content source 114, 116 and establish a connection between the client device 104 and the desired content source 114, 116 for streaming or otherwise view the desired media program within media player 107.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A server comprising:
a memory having stored therein a first listing of media programs available from a first content source and a second listing of media programs available from a second content source, the second listing being obtained from an associating server coupled to the server via a network, the associating server being configured to obtain a plurality of uniformly formatted media data objects from a receiving server and format each uniformly formatted media data object of the plurality of uniformly formatted media data objects to include a respective program identifier associated with a respective media program corresponding to that respective uniformly formatted media data object, resulting in the second listing comprising a plurality of associated media data objected corresponding to media programs available from the second content source; and
a processor coupled to the memory, the processor being configured to receive search criteria indicative of a desired media program, identify a first media data object in the first listing corresponding to a first instance of the desired media program available from the first content source, obtain a target program identifier from the first media data object, identify a second media data object in the second listing corresponding to a second instance of the desired media program available from the second content source using the target program identifier, and provide a combined search result indicating availability of the desired media program from the first content source and the second content source.

2. The server of claim 1, wherein the first content source is a digital video recorder.

3. The server of claim 2, wherein the processor obtains the first listing of media programs from the digital video recorder and stores the first listing in the memory.

4. The server of claim 2, wherein the second content source is selected from a group consisting of an online programming source and an on-demand programming source.

5. The server of claim 1, wherein:
the first content source is a media device coupled to the network; and
the second content source is selected from a group consisting of an online programming source coupled to the network and an on-demand programming source coupled to the network.

6. The server of claim 5, wherein the processor obtains the first listing of media programs from the media device, stores the first listing in the memory, obtains the second listing of media programs from the associating server coupled to the network, and stores the second listing in the memory.

7. The server of claim 1, wherein the first content source is a broadcast source.

8. The server of claim 7, wherein the processor obtains the first listing of media programs from a program guide and stores the first listing in the memory.

9. The server of claim 7, wherein the second content source is selected from a group consisting of an online programming source and an on-demand programming source.

10. The server of claim 1, wherein the processor is coupled to the network to obtain the second listing of media programs from the associating server coupled to the network and stores the second listing in the memory.

11. A method to identify instances of a desired media program available within a media distribution system, the method comprising:
searching, by a processing system, a first listing of media programming available from a first content source using search criteria indicative of the desired media program to identify a first instance of the desired media program available from the first content source;
obtaining, by the processing system, a target program identifier associated with the desired media program from the first instance;
obtaining, by a receiving server, a first plurality of media data objects from a first online programming source and a second plurality of media data objects from a second online programming source;
uniformly formatting, by the receiving server, each media data object of the first plurality and the second plurality, resulting in a plurality of media data objects;
obtaining, by an associating server communicating with the receiving server and the processing system, the plurality of media data objects;
determining, by the associating server, for each media data object, a respective program identifier associated with its corresponding media program; and
formatting, by the associating server, each media data object to include a field having a value equal to the respective program identifier, resulting in a plurality of formatted media data objects;
identifying, by the processing system, a second instance of the desired media program available from the first online programming source or the second online programming source by searching the plurality of formatted media data objects for a formatted media data object having the value for the field equal to the target program identifier; and
providing, by the processing system, a combined search result that indicates availability of the desired media program from the first content source and the first online programming source or the second online programming source.

12. The method of claim 11, wherein the processing system is a host server communicating with a client device over a network, the search criteria being provided by a user of the client device, wherein the method further comprises receiving, by the host server, the search criteria from the client device.

13. The method of claim 12, wherein providing the combined search result comprises displaying a graphical representation of the combined search result in an application on the client device.

14. A media distribution system comprising:
a receiving server to obtain the plurality of media data objects from an online programming source and format the plurality of media data objects using a uniform format, resulting in a plurality of uniformly formatted media data objects;
an associating server to obtain the plurality of uniformly formatted media data objects from the receiving server and format each uniformly formatted media data object of the plurality of uniformly formatted media data objects to include a respective program identifier associated with a respective media program corresponding to that respective uniformly formatted media data object, resulting in a plurality of associated media data objects corresponding to media programs available from a second content source; and
a host server coupled to the associating server to obtain the plurality of associated media data objects, the host server comprising:
a memory having stored therein a first listing of media programs available from a first content source and a second listing of the media programs available from the second content source; and
a processor coupled to the memory, the processor being configured to: receive search criteria indicative of a desired media program;
identify a target media data object in the first listing corresponding to a first instance of the desired media program available from the first content source;
obtain a target program identifier from the first media data object; identify a second media data object of the plurality of associated media data objects in the second listing corresponding to a second instance of the desired media program available from the second content source using the target program identifier; and
provide a combined search result indicating availability of the desired media program from the first content source and the second content source.

15. The media distribution system of claim 14, the first listing comprising a plurality of media programs stored on a media device coupled to the host server over a network, wherein the host server is configured to determine the target program identifier by matching the search criteria to metadata of a first media program of the plurality of media programs and utilizing a first program identifier associated with the first media program as the target program identifier.

16. The media distribution system of claim 15, wherein the host server is configured to provide the combined search result by:
indicating the desired media program is available from the media device in response to matching the search criteria to metadata of the first media program; and indicating the desired media program is available from the online programming source in response to identifying the first media data object.

17. The media distribution system of claim 14, wherein for each respective uniformly formatted media data object of the plurality of uniformly formatted media data objects, the associating server is configured to determine the respective program identifier associated with the respective media program corresponding to that respective uniformly formatted media data object by matching one or more fields of metadata for that respective uniformly formatted media data object to metadata of a media data object in a database configured to maintain associations between program identifiers and media programs.

18. The media distribution system of claim 14, wherein the host server is configured to determine the target program identifier by matching the search criteria to metadata of a media data object in a database that corresponds to the desired media program, the database being configured to maintain associations between program identifiers and media programs.

19. The media distribution system of claim 14, wherein the host server is configured to determine the target program identifier by matching the search criteria to metadata of a media data object obtained from a program guide that corresponds to the desired media program.

20. A method of identifying instances of a desired media program available within a media distribution system, the method comprising:
receiving, by a host server, the search criteria indicative of the desired media program from a client device coupled to the host server over a network;
obtaining, by the host server, stored media programming available from a media device coupled to the network;
searching, by the host server, the stored media programming available from the media device using the search criteria to identify a first media data object in the stored media programming available from the media device corresponding to a first instance of the desired media program available from the media device, the first media data object having a target program identifier associated therewith;
obtaining the target program identifier associated with the desired media program from the first media data object corresponding to the first instance of the desired media program;
obtaining, by an associating server coupled to the host server over the network, a second media data object corresponding to the desired media program available from an online programming source;
formatting, by the associating server, the second media data object to include the target program identifier to associate the second media data object with the desired media program;
in response to identifying the first media data object based on the search criteria: obtaining the target program identifier from the first media data object; and
identifying the second media data object corresponding to a second instance of the desired media program in a second listing of media programming available from the online programming source using the target program identifier; and
providing a combined search result that indicates availability of the first instance of the desired media program from the media device and availability of the second instance of the desired media program from the online programming source.

21. The method of claim 20, further comprising:
determining the second media data object corresponds to the desired media program based on one or more metadata fields of the second media data object; and
obtaining the target program identifier associated with the desired media program from a database maintaining associations between program identifiers and media programs prior to formatting the second media data object.

22. A method of identifying instances of a desired media program available within a media distribution system, the method comprising:
receiving, by a host server, search criteria indicative of the desired media program from a client device coupled to the host server over a network;
obtaining, by the host server, stored media programming available from a media device coupled to the network;
searching, by the host server, the stored media programming available from the media device using the search criteria to identify a first media data object in the stored media programming available from the media device corresponding to a first instance of the desired media program available from the media device, the first media data object having a target program identifier associated therewith;
obtaining the target program identifier associated with the desired media program from the first media data object corresponding to the first instance of the desired media program;
obtaining, by an associating server coupled to the host server over the network, a second media data object corresponding to the desired media program available from an on-demand programming source;
formatting, by the associating server, the second media data object to include the target program identifier to associate the second media data object with the desired media program;
in response to identifying the first media data object based on the search criteria: obtaining the target program identifier from the first media data object; and
identifying the second media data object corresponding to a second instance of the desired media program in a second listing of media programming available from the online programming source using the target program identifier; and
providing a combined search result that indicates availability of the first instance of the desired media program from the media device and availability of the second instance of the desired media program from the on-demand programming source.

23. A method of identifying instances of a desired media program available within a media distribution system, the method comprising:
receiving, by a host server, search criteria indicative of the desired media program from a client device coupled to the host server over a network;
obtaining, by the host server, upcoming media programming available from a broadcast source;
searching, by the host server, the upcoming media programming available from the broadcast source using search criteria to identify a first media data object in the upcoming media programming corresponding to a first instance of the desired media program available from the broadcast source, the first media data object having a target program identifier associated therewith;

obtaining the target program identifier associated with the desired media program from the first media data object corresponding to the first instance of the desired media program;

obtaining, by an associating server coupled to the host server over the network, a second media data object corresponding to the desired media program available from an online programming source;

formatting, by the associating server, the second media data object to include the target program identifier to associate the second media data object with the desired media program;

in response to identifying the first media data object based on the search criteria: obtaining the target program identifier from the first media data object; and identifying the second media data object corresponding to a second instance of the desired media program in a second listing of media programming available from the online programming source using the target program identifier; and providing a combined search result that indicates availability of the first instance of the desired media program from the media device and availability of the second instance of the desired media program from the on-demand programming source.

24. A method of identifying instances of a desired media program available within a media distribution system, the method comprising:

receiving, by a host server, search criteria indicative of the desired media program from a client device coupled to the host server over a network;

obtaining, by the host server, upcoming media programming available from a broadcast source;

searching, by the host server, the upcoming media programming available from the broadcast source using search criteria to identify a first media data object in the upcoming media programming corresponding to a first instance of the desired media program available from the broadcast source, the first media data object having a target program identifier associated therewith;

obtaining the target program identifier associated with the desired media program from the first media data object corresponding to the first instance of the desired media program;

obtaining, by an associating server coupled to the host server over the network, a second media data object corresponding to the desired media program available from an on-demand programming source;

formatting, by the associating server, the second media data object to include the target program identifier to associate the second media data object with the desired media program;

in response to identifying the first media data object based on the search criteria: obtaining the target program identifier from the first media data object; and identifying the second media data object corresponding to a second instance of the desired media program in a second listing of media programming available from the online programming source using the target program identifier; and providing a combined search result that indicates availability of the first instance of the desired media program from the media device and availability of the second instance of the desired media program from the on-demand programming source.

* * * * *